Nov. 28, 1933.  L. L. KEEFE  1,937,428
SWEET POTATO VINE CUTTER
Filed Dec. 12, 1932
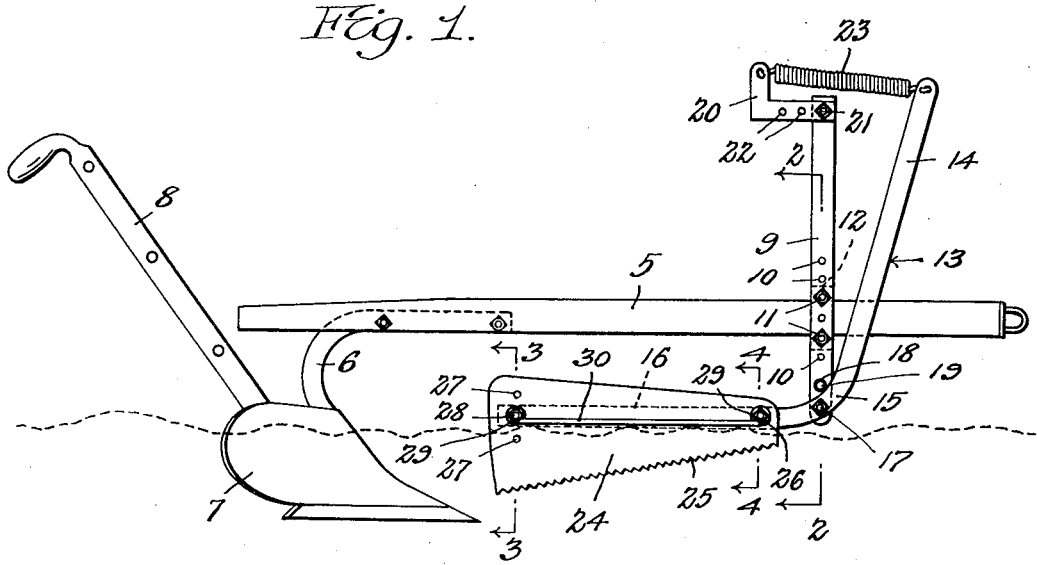
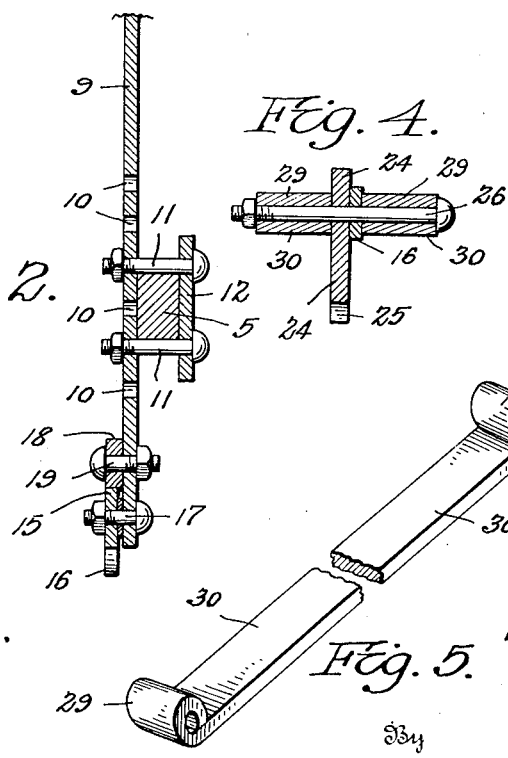
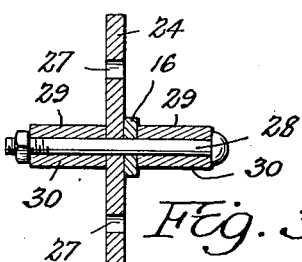
Inventor
LONNIE L. KEEFE Patented Nov. 28, 1933

1,937,428

UNITED STATES PATENT OFFICE 1,937,428

SWEET POTATO VINE CUTTER

Lonnie L. Keefe, Hyman, S. C., assignor of one-third to John Ernest Bostick, Pamplico, S. C., and one-third to Junior Burt Poston, Hyman, S. C.

Application December 12, 1932. Serial No. 646,908

5 Claims. (Cl. 97—208)

My invention relates to a device for cutting sweet potato vines, or the like.

An important object of the invention is to provide a device of the above-mentioned character, which may be mounted upon the beam of an ordinary plow, suitable for digging sweet potatoes, so that the cutting device will travel in front of the plow-share, to cut the vines prior to the digging of the potatoes by the plow-share.

A further object of the invention is to provide a cutting device of the above-mentioned character, which will automatically adjust itself to obstructions, or irregularities in the hill or ridge.

A further object of the invention is to provide depth guards for regulating the depth that the blade will enter the hill or ridge.

A further object of the invention is to provide means whereby the blade is adjustable vertically with respect to the depth guards.

A further object of the invention is to provide means whereby the cutting device, as a whole, may be secured to the beam of the plow at different selected elevations.

Other objects and advantages of the invention will be apparent during the course of the following description.

In the accompanying drawing, forming a part of this specification, and in which like numerals are employed to designate like parts throughout the same, Figure 1 is a side elevation of a vine cutting device, showing the same applied to the beam of a plow, Figure 2 is a transverse section taken on line 2—2 of Figure 1, Figure 3 is a similar view taken on line 3—3 of Figure 1, Figure 4 is a transverse section taken on line 4—4 of Figure 1, Figure 5 is a perspective view of one of the depth guards.

In the drawing, wherein for the purpose of illustration is shown a preferred embodiment of my invention, the numeral 5 designates a plow beam attached to a standard 6, carrying the plow-share 7, suitable for digging sweet potatoes. The numeral 8 designates the usual handles of the plow.

Disposed upon one side of the plow beam 5 is a vertically arranged support or bar 9, having a longitudinal set of spaced apertures 10 formed therein, for receiving clamping bolts 11, passing through apertures in a clamp plate 12. It is thus seen that means is provided to clamp the bar or support 9 to the beam 5, at selected elevations.

The numeral 13 designates a vertically swinging blade carrying arm, having a forward upstanding portion 14, an intermediate curved portion 15, and a rear horizontal portion 16. The intermediate curved portion 15 is pivotally connected with the lower end of the support or bar 9, projecting beneath the beam 5, by means of a bolt 17, or the like, and a stop 18 is arranged at the rear of the curved portion 15, above the pivot 17, and this stop is carried by a bolt 19, attached to the lower portion of the support or bar 9. The function of this stop is to limit the rearward swinging movement of the forward upstanding portion 14.

The numeral 20 designates an L-shaped bracket, having an adjustable connection with the upper end of the support or bar 9, by means of a bolt 21, and a series of apertures 22. The arrangement is such that the bracket may be clamped to the bar or support 9 in selected adjusted positions, at different distances from the bar 9, with respect to the horizontal. This L-shaped bracket has its upper end connected with a retractile coil spring 23, the forward end of which is attached to the upper end of the swinging lever 13, as shown.

The numeral 24 designates a blade or cutter having its lower edge preferably provided with teeth 25. This blade or cutter is preferably longitudinally tapered and decreases in width forwardly. The forward end of the blade or cutter 24 is provided with an aperture forwardly receiving a bolt 26, also passing through an aperture in the rear horizontal arm portion 16. The rear end of the blade or cutter 24 is provided with a vertically arranged set of spaced apertures 27, a selected aperture 27 receiving a bolt 28, passing through an aperture in the rear end of the horizontal arm 16. The bolts 26 and 28 also pass through knuckles 29, formed upon the forward and rear ends of depth guards or runners 30. As more clearly shown in Figure 3, the blade or cutter 24 is arranged in contact with one side of the arm portion 16, one depth guard 30 engages the outer face of the blade or cutter 24, while the other depth guard 30 engages the outer face of the arm portion 16, all of these elements being rigidly clamped together by proper manipulation of the bolts 26 and 28. It is obvious that the rear end of the blade or cutter 24 may be vertically adjusted with respect to the depth guards 30, by manipulation of the bolts 26 and 28, and again clamped in the selected adjusted position.

The operation of the apparatus is as follows:

The support or bar 9 being clamped to the bar 5 at the selected elevation, the blade or cutter 24 travels in advance of the plow-share 17, and is forced into the hill or ridge by yielding action of the spring 23. Should the rear arm portion 16 or blade or cutter 24 encounter an obstruction, or irregularity in the hill or ridge, the same is free to move vertically, up or down, to automatically adjust itself with respect to the surface. The intermediate portion 15 being curved, will also permit of the arm portion 16 swinging upwardly, when this curved portion, at the rear of its pivot, encounters an obstruction. The spring 23 is of suitable stiffness to force the cutter or blade 25 into firm engagement with the vines, so that it will cut through the same, and the depth guards or runners 30, travelling upon the top of the hills or ridges, regulate the extent of the downward movement of the blade or cutter, and also tend to hold the vines in proper position so that they may be readily cut.

It is to be understood that the form of my invention herewith shown and described, is to be taken as the preferred example of the same, and that various changes in the shape, size and arrangement of parts may be resorted to without departing from the spirit of the invention, or the scope of the subjoined claims.

Having fully described my invention, what I claim is:—

1. A device for cutting sweet potato vines or the like, comprising a generally horizontal arm part extending longitudinally of a plow beam, means for pivotally connecting the arm part with the plow beam, a blade extending longitudinally of the arm part, depth guards arranged upon opposite sides of the blade and extending longitudinally thereof, and bolts carried by the arm part and serving to clamp the blade and depth guards to the arm part.

2. A device for cutting sweet potato vines or the like, comprising a generally vertical support arranged upon a plow-beam and extending above the plow-beam for a substantial distance and below the plow-beam for a relatively short distance, means to clamp the support to the plow-beam, a generally L-shaped arm having an upstanding portion and a generally horizontal portion, the upstanding portion extending above the plow-beam for a substantial distance and terminating near the upper end of the generally vertical support, the generally horizontal portion being arranged beneath the plow-beam and extending longitudinally thereof, means pivotally connecting the generally L-shaped arm with the lower end of the generally vertical support so that the arm swings vertically longitudinally of the beam, an elongated blade extending longitudinally of the generally horizontal portion, an elongated depth gauge extending longitudinally of the blade throughout the major portion of its length, and means to clamp the blade and depth gauge to the generally horizontal portion so that the blade is reinforced and stiffened.

3. A device for cutting sweet potato vines or the like, comprising a generally vertical support arranged upon a plow-beam and extending above and below the same, means to clamp the support to the plow-beam, a generally L-shaped arm having an upstanding portion and a generally horizontal portion, the upstanding portion extending above the plow-beam and the generally horizontal portion being arranged beneath the plow-beam, means pivotally connecting the generally L-shaped arm with the lower end of the generally vertical support, an elongated blade extending longitudinally of the generally horizontal portion in contact therewith, an elongated depth gauge extending longitudinally of the blade throughout the major portion of its length, means to clamp the blade and depth gauge to the generally horizontal portion so that the blade is reinforced and stiffened, and a spring connecting the upper end of the generally vertical support and the upper end of the upstanding portion.

4. A device for cutting sweet potato vines or the like, comprising a pivoted arm carried by a plow-beam, an elongated blade engaging the arm and extending longitudinally of a portion of the same and having apertures, a depth gauge extending longitudinally of the blade in engagement therewith and having apertures, and bolts carried by the arm and extending to the apertures of the blade and depth gauge, the arrangement being such that the bolts are adapted to clamp these elements together for reinforcing and stiffening the blade.

5. A device for cutting sweet potato vines or the like, comprising an arm to be mounted upon a plow beam and having a generally horizontal portion, an elongated blade extending longitudinally of the horizontal portion and provided at one end with an aperture and at its opposite end with a plurality of spaced apertures, a generally horizontal depth gauge extending longitudinally of the blade throughout the major portion of its length and having apertured ends, and bolts carried by the generally horizontal portion and adapted to be passed through the apertures of the blade and depth gauge, the arrangement of the vertically spaced apertures being such that the blade may be angularly adjusted and the blade, depth gauge and generally horizontal portion clamped together.

LONNIE L. KEEFE.